UNITED STATES PATENT OFFICE.

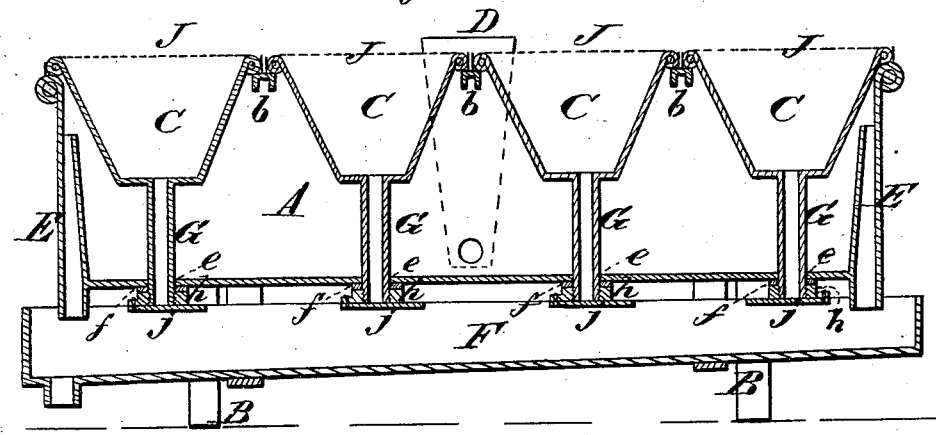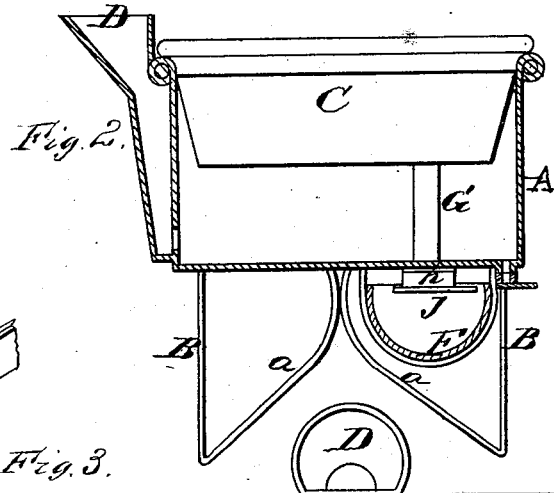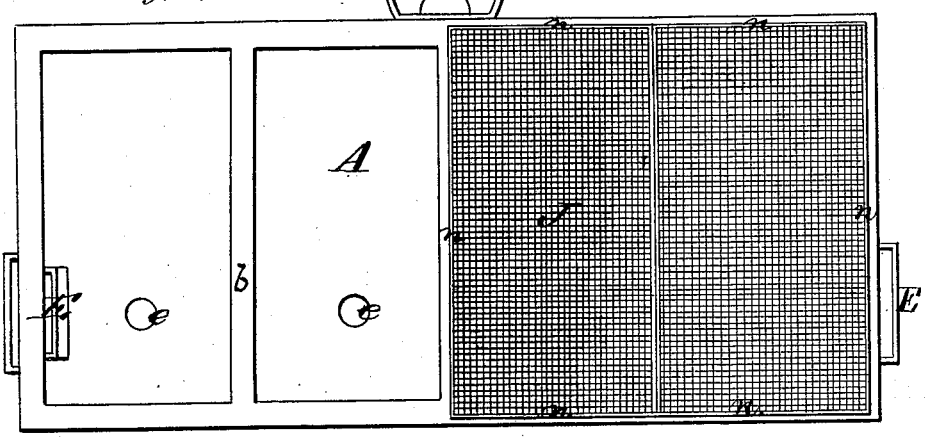

FRANKLIN W. MOORE, OF ERIEVILLE, NEW YORK.

IMPROVEMENT IN MILK-COOLERS.

Specification forming part of Letters Patent No. 164,197, dated June 8, 1875; application filed March 20, 1875.

*To all whom it may concern:*

Be it known that I, FRANKLIN W. MOORE, of Erieville, in the county of Madison and State of New York, have invented a new and valuable Improvement in Milk Cooling and Warming Devices; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my milk-cooler, and Fig. 2 is a transverse vertical sectional view of the same. Fig. 3 is a plan view, and Figs. 4 and 5 are detail views.

This invention has relation to apparatus for keeping milk at the proper temperature for yielding the largest amount of cream; and the nature of my invention consists mainly in screw-caps for hermetically closing the lower ends of the pipes which lead from the milk-pans through the bottom of the water-tank, and which at the same time tightly close the joints around said pipes, and prevent leakage at these points. It finally consists in removable covers for the milk-pans, which are made of wire-gauze and tightly-fitting rims or flanges, for the purpose of excluding insects and foreign substances from the milk-pans, as will be hereinafter explained.

In the annexed drawings, A designates a tank, which may be of any suitable capacity, and which is mounted on legs B of the form of the capital letter M. The upright portions of these legs sustain the sides of the tank, and the inclined portions *a* serve as braces for the upright portions, and also sustain the bottom of the tank and prevent it from sagging.

Legs thus constructed can be made very light, so as not to interfere with the portability of the apparatus, and each leg can be made of a single piece.

C C designate the milk-pans, which taper downward, and which are sustained in the tank by means of their rims resting upon cross-bars *b* and the upper edges of the tank.

D designates a funnel, through which water is poured into the tank A, and E E are overflow-outlets, from which the water escapes from the tank into a long inclined trough, F, and is finally conducted off at the lower end of this trough. Each milk-pan C is provided with a draw-off pipe, G, which passes down through a hole, *e*, made through the bottom of the tank A, and has a screw-thread on its lower end. On each pipe G a washer, *f*, is applied, which is tightly confined against the bottom of the tank A by means of a screw-ring, *h*, having an ear formed on its periphery, to which a gate, *j*, is pivoted.

The packing or washer *f* closes tightly the joint between the pipe G and the edge of the hole through the tank, and prevents leakage, and the gate *j* closes the lower end of the pipe G, and allows milk to be drawn from the pan into the trough F.

When it is desired to remove a milk-pan from the tank A, this can be done by unscrewing the ring *h*.

J J designate wire-gauze covers for the pans. The four edges of each sheet of gauze are pressed into flanges *n* of sheet metal, which flanges are not connected together at their ends. This allows the flanges to be sprung over the rims of the pans C, and to hug the same closely and securely, requiring no other fastening to keep the covers on the pans.

What I claim as new, and desire to secure by Letters Patent, is—

1. In a milk pan and cooler, the combination of the tank A, pans C, draw-off pipes G, washer *f*, screw-ring *h*, and gate *j* with the inclined trough F, supported upon legs B, substantially as described.

2. Removable wire-gauze covers J, having flanges *n*, which are disconnected at their ends, and pressed on their edges, as described.

In testimony that I claim the above I have hereunto subscribed my name in the presence of two witnesses.

FRANKLIN W. MOORE.

Witnesses:
FRANCIS J. MASI,
GEORGE E. UPHAM.